US010334179B2

(12) United States Patent
Clynne et al.

(10) Patent No.: US 10,334,179 B2
(45) Date of Patent: Jun. 25, 2019

(54) ASSEMBLY AND METHOD FOR GLARE ELIMINATION

(71) Applicant: GENERAL ELECTRIC COMPANY, Schenectady, NY (US)

(72) Inventors: Thomas Clynne, East Cleveland, OH (US); Koushik Babi Saha, East Cleveland, OH (US); Jonathan Robert Meyer, East Cleveland, OH (US)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 15/705,415

(22) Filed: Sep. 15, 2017

(65) Prior Publication Data

US 2018/0084172 A1 Mar. 22, 2018

Related U.S. Application Data

(60) Provisional application No. 62/397,466, filed on Sep. 21, 2016.

(51) Int. Cl.
| | |
|---|---|
| *H04N 5/225* | (2006.01) |
| *H04N 5/238* | (2006.01) |
| *F21S 8/08* | (2006.01) |
| *F21V 3/00* | (2015.01) |
| *F21V 7/08* | (2006.01) |
| *F21V 11/16* | (2006.01) |
| *H04N 5/217* | (2011.01) |
| *F21Y 115/10* | (2016.01) |

(52) U.S. Cl.
CPC .............. *H04N 5/238* (2013.01); *F21S 8/086* (2013.01); *F21V 3/00* (2013.01); *F21V 7/08* (2013.01); *F21V 11/16* (2013.01); *H04N 5/217* (2013.01); *H04N 5/2252* (2013.01); *H04N 5/2253* (2013.01); *H04N 5/2257* (2013.01); *F21Y 2115/10* (2016.08)

(58) Field of Classification Search
CPC ......... H04N 5/238; H04N 5/217; F21S 8/086; F21Y 2115/10
See application file for complete search history.

(56) References Cited

U.S. PATENT DOCUMENTS

| | | | | |
|---|---|---|---|---|
| 3,797,934 | A * | 3/1974 | Miller | .................... G03B 15/00 355/52 |
| 4,594,646 | A * | 6/1986 | Von Kohorn | .......... A01G 7/045 362/101 |
| 5,305,012 | A | 4/1994 | Faris | |
| 6,646,801 | B1 | 11/2003 | Sley | |
| 8,382,387 | B1 * | 2/2013 | Sandoval | ............... G03B 29/00 348/143 |
| 10,094,551 | B1 * | 10/2018 | Gabriel | ................ G08B 15/001 |

(Continued)

*Primary Examiner* — Donald L Raleigh
(74) *Attorney, Agent, or Firm* — Buckley, Maschoff & Talwalker LLC (57) ABSTRACT

An assembly is disclosed, which comprises a light fixture comprising a light source thereon; an image capturing device mounted adjacent with the light source; and a housing covering the image capturing device, wherein the housing has a window within a field of view of the image capturing device; wherein at least a portion of the window serving as working optical surface of the image capturing device is located within a shadow of direct light from the light source of the light fixture.

16 Claims, 8 Drawing Sheets

(56) References Cited

U.S. PATENT DOCUMENTS

| | | | | |
|---|---|---|---|---|
| 2004/0032728 A1* | 2/2004 | Galli | ............ | H01L 33/60 |
| | | | | 362/84 |
| 2009/0185376 A1* | 7/2009 | Yu | ............ | G08B 13/19632 |
| | | | | 362/253 |
| 2011/0134239 A1* | 6/2011 | Vadai | ............ | F21S 2/00 |
| | | | | 348/143 |
| 2013/0250579 A1* | 9/2013 | Athalye | ............ | F21V 21/00 |
| | | | | 362/296.05 |
| 2015/0043200 A1* | 2/2015 | Wilson | ............ | F21S 9/035 |
| | | | | 362/145 |
| 2015/0260391 A1* | 9/2015 | Wassel | ............ | F21V 33/0052 |
| | | | | 348/373 |

* cited by examiner

ASSEMBLY AND METHOD FOR GLARE ELIMINATION

CROSS REFERENCE TO RELATED APPLICATIONS

This application claims the benefit of U.S. provisional application Ser. No. 62/397,466 filed Sep. 21, 2016.

BACKGROUND

This disclosure relates generally to an optical imaging system, and more particularly to an assembly and method for glare elimination in light fixture mounted image sensing system.

Optical glare from a lighting fixture located in close proximity to optical imaging systems can degrade the performance of the optical imaging system and can be difficult to handle. This performance degradation creates other challenges when doing computer image analytics, such as ghost images, optical flares, corruption of target image boundaries, etc. The elimination of these "noise" sources in image analytic systems greatly improves the fidelity of the data being generated. The elimination of optical noise makes the data being generated from an analytics system more reliable and the overall performance of the system better, thereby making it more valuable.

BRIEF DESCRIPTION

In one embodiment, the present disclosure provides an assembly, which comprises a light fixture comprising a light source thereon; an image capturing device mounted with the light source; and a shield of opaque or diffusive material provided between the light source and a working optical surface of the image capturing device for creating a shadow.

In another embodiment, the present disclosure provides an assembly, which comprises a light fixture comprising a light source thereon; an image capturing device mounted with the light source; and a housing covering the image capturing device, wherein the housing has a window within a field of view of the image capturing device; wherein at least a portion of the window serving as working optical surface of the image capturing device is located within a shadow of direct light from the light source of the light fixture.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described herein below with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The terms such as "front," "back," "bottom," and/or "top," unless otherwise noted, are merely used for convenience of description, and are not limited to any one position or spatial orientation. The term "or" is meant to be inclusive and mean either or all of the listed items. The use of "including," "comprising," or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

Embodying assemblies and methods can greatly reduce or eliminate optical glare in image capturing devices, such as a camera, when used in proximity with intense light sources, such as roadway fixtures. It does this by typically requiring that any line of sight from an intense light source in the same assembly, going into the camera should be blocked by a shield made of opaque or diffusive material to prevent the creation of glare either from contamination on an optical surface of the camera (including camera lens and protective windows above the camera), or from other optical abnormalities such as lens barrel reflections, retro-reflections within an optical imaging element or many other issues with optics caused by off-axis or out-of-field glare sources.

When installing image capturing device, such as camera or sensor systems onto outdoor light fixtures, it is advantageous to house these cameras within an external housing in order to reliably and robustly facilitate handling, cosmetic and environmental issues. It is also sometimes desirable to position the cameras of these systems behind a glass or other transparent window for environmental protection as well as for cosmetic reasons. As with all optical systems, dirt and other scattering contamination can accumulate on optical surfaces of cameras including camera lens and the window on the housing, and when this happens, these dirt and other scattering contamination can cause glare to occur in the image, particularly if there are intense light sources in the nearby vicinity, such as those found on LED street lighting systems.

Figure 1:
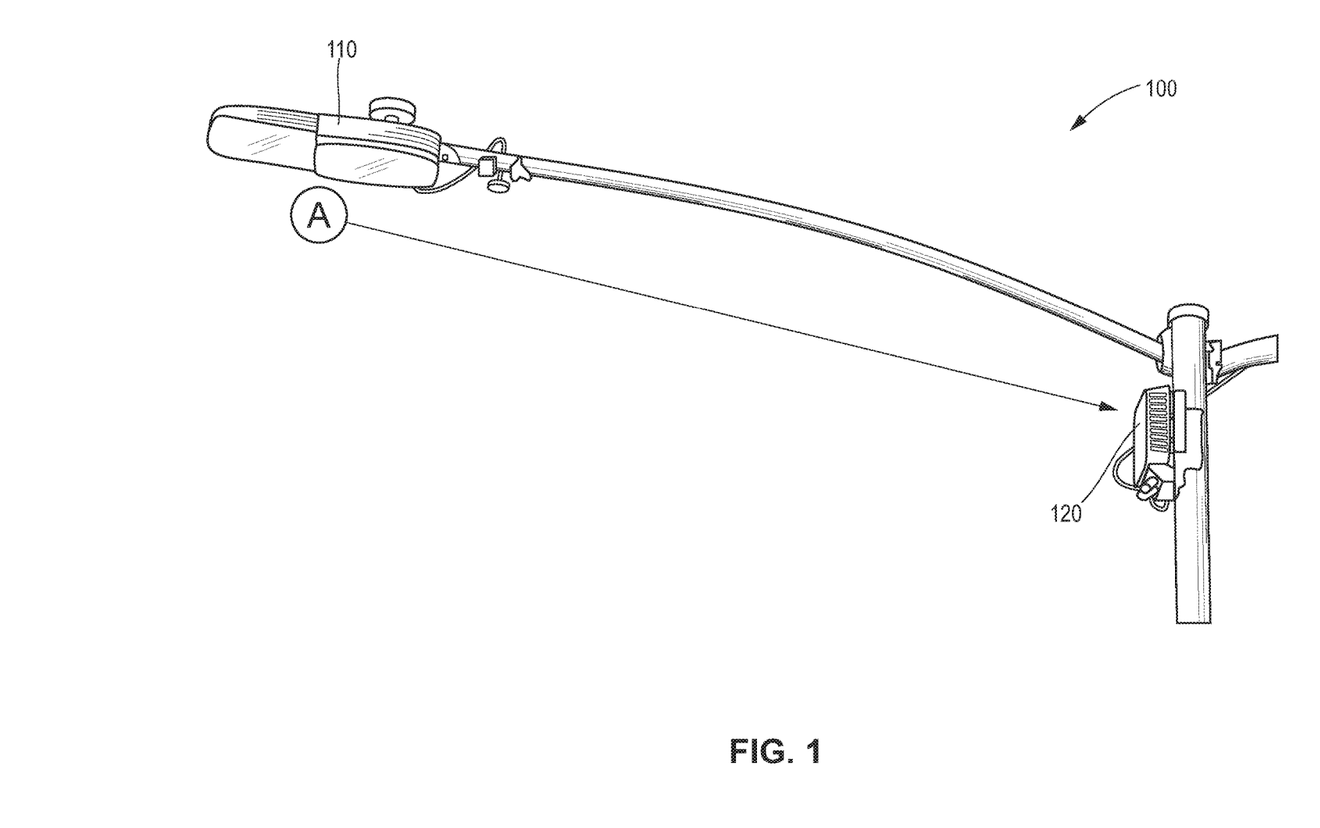
FIG. 1 depicts a conventional pole-mounted lighting fixture and optical imaging system combination.

FIG. 1 depicts a pole-mounted conventional lighting fixture and optical imaging system 100. Light fixture 110 includes a light source that can emit light with a broad spatial distribution pattern. Similarly, optical imaging system 120 can include unprotected cameras which gather light and images over a broad spatial distribution. A ray path (represented by arrow A) from the light source towards the camera can cause glare in the image captured by the camera.

Figure 2:
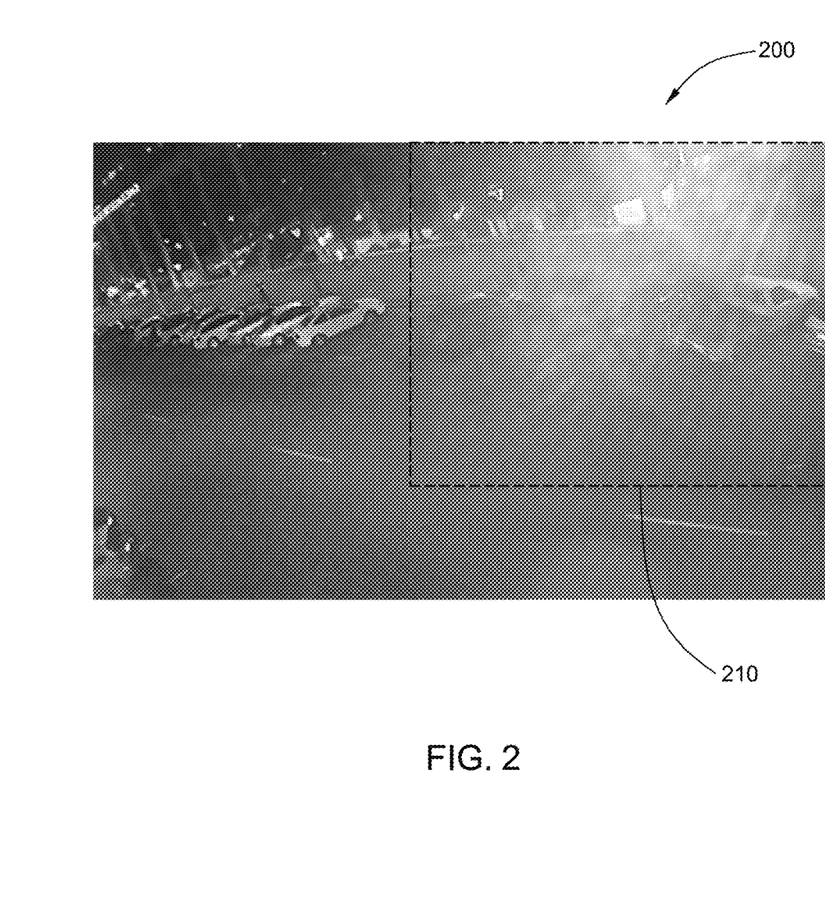
FIG. 2 depicts an image captured by an optical imaging system.

FIG. 2 depicts image 200 captured by an optical imaging system in proximity to a light fixture. As can be seen in region 210 the image suffers from glare caused by an intense light source of the light fixture outside of the imaging area. The glare effect within region 210 is greater than those portions of image 200 outside the region due to the relative positioning of the light source and the optical system. The effect of the optical noise can be made worse by dirt and/or contamination on the camera lens and, if present, a window on the optical imaging system housing.

Together with having dirt and/or contamination on the camera lens and/or a housing window, it is also possible to make the glare issue worse by the type of light source optical system used within the lighting fixture. "Sparkly" sources, such as direct view of LEDs, or the use of Total Internal reflection (TIR) optics can make this problem worse by concentrating the light source into a small area, thereby increasing the apparent local intensity.

Figure 3A:
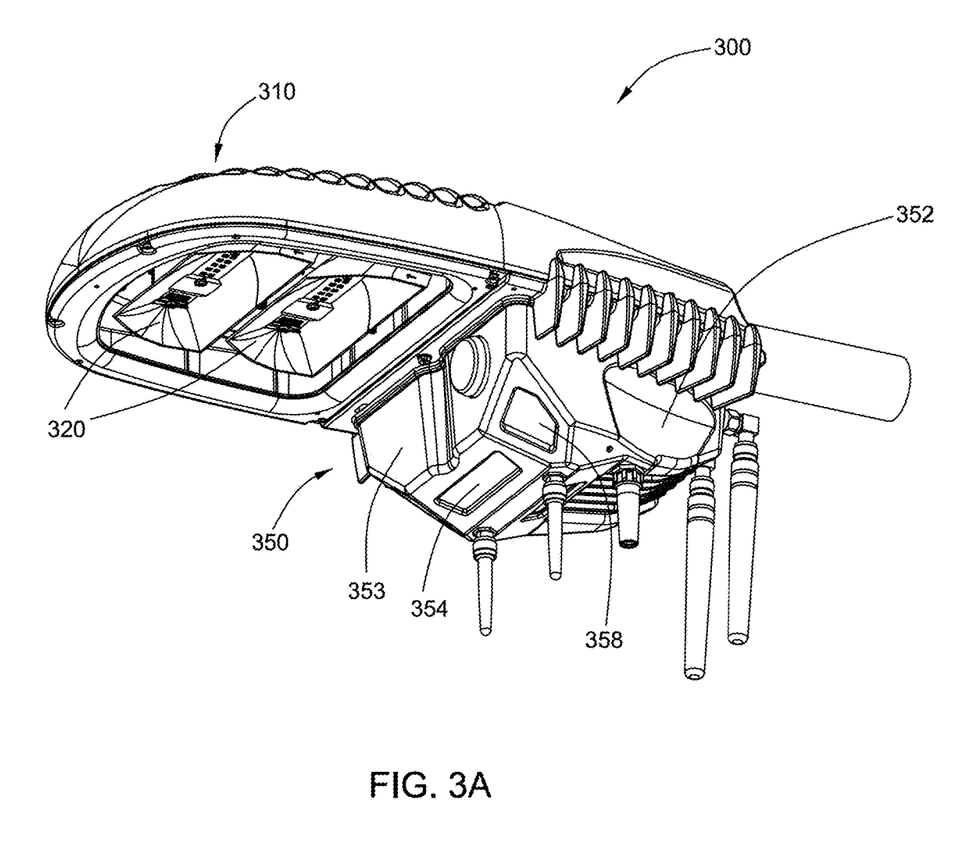
FIG. 3A depicts an assembly of a light fixture and an image capturing device in accordance with embodiments.

FIG. 3A depicts an assembly 300 in accordance with embodiments. The assembly 300 includes a light fixture 310 and an image capturing device 350 such as a camera mounted on opposite ends of the assembly respectively. In accordance with embodiments, the light fixture includes one or more light sources 320 that contains reflector 326.

Figure 3B:
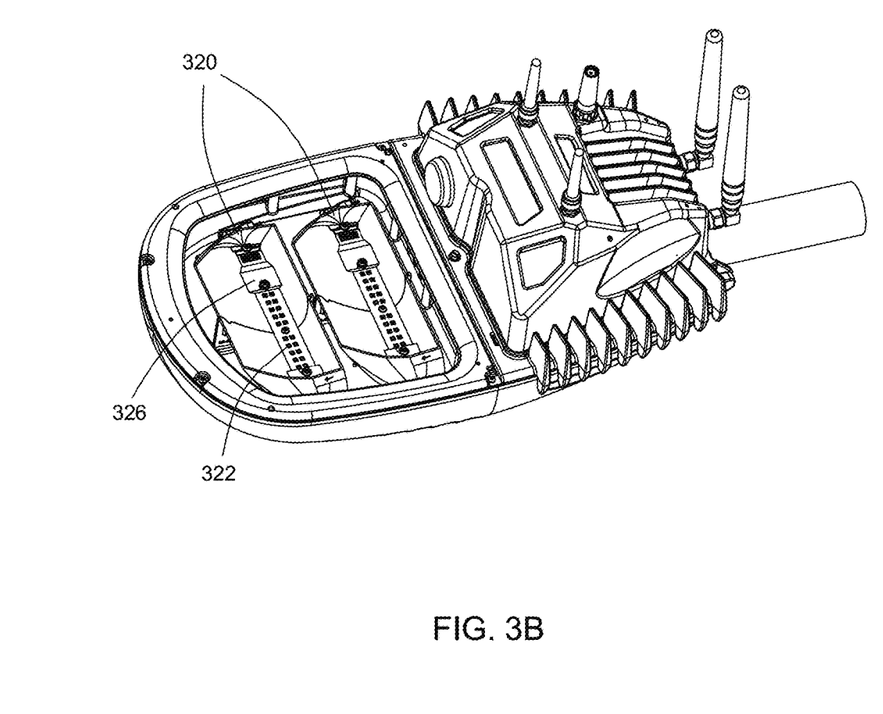
FIG. 3B depicts a second view angle of FIG. 3A.

FIG. 3B depicts light sources 320 of the assembly 300. Light sources 320 can each include lamp(s) 322 positioned within a reflector 326—for example, an ellipsoidal reflector. In some implementations the positioning of the lamp within the reflector can result in spatially shielding the distribution pattern of the light emission from the light source 320. The reflective optics of the reflector can homogenize the light source (e.g., LED) and make it less "sparkly".

With reference to FIG. 3A, the image capturing device 350 can include a housing 352, and one or more optical imaging units (e.g., front, left, right, rear cameras) located within the housing 352. The housing can include transparent windows (e.g., windows 354, 358) within the field-of-view of each optical imaging unit. The housing include a shield 353 of opaque or diffusive material provided between the light source and a working optical surface of the image capturing device for creating a shadow.

In accordance with embodiments, the impact of glare, and/or scattering, on the image quality can be reduced by placing the window of the image capturing device, such as its external windows, into the shadows of the light source. By shadowing the light source, the opportunity for the glare source to affect the image can be substantially eliminated. In accordance with implementations, at a minimum only the portions of the windows or the working optical surfaces that participate in the formation of the optical imaging system that is used to create an image need be cast into shadow. It is not necessary to cast the entire surfaces of optical imaging systems into shadow, however such an arrangement is within contemplation of this disclosure.

In accordance with embodiments, the incoming light source can be dispersed by the use of a scattering material (e.g., plastic diffuser, light absorbent material, scattering material, etc.), which is provided on the housing to break up the intense, "sparkly" nature of the light source. The scattering material can be attached to the outer surface of the housing or could be mounted to the light fixture.

Figure 4A:
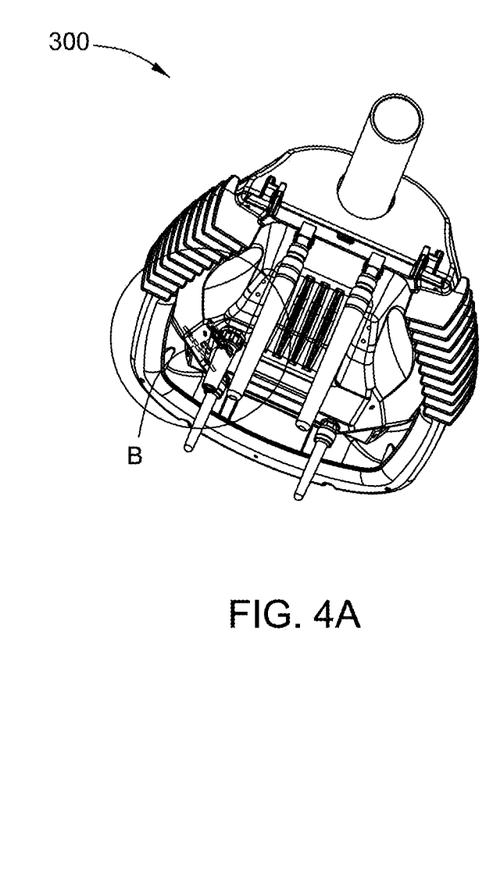
FIG. 4A depicts a third view angle of FIG. 3A.
Figure 4B:
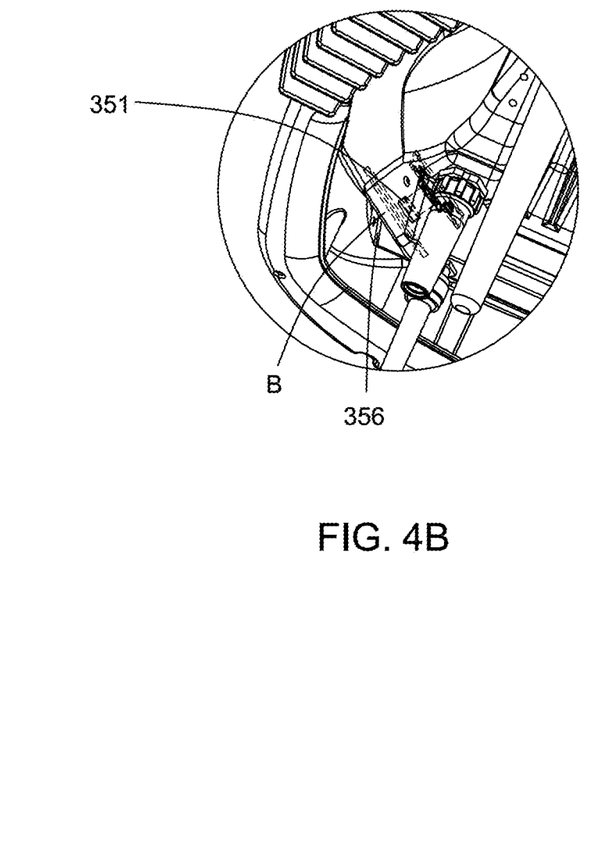
FIG. 4B depicts a partially enlarged view of FIG. 4A.
Figure 5:
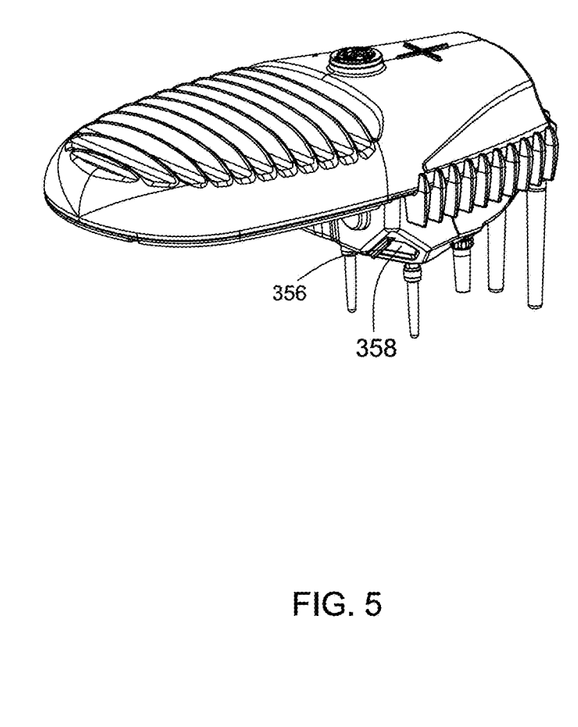
FIG. 5 depicts a fourth view angle of FIG. 3A.

FIG. 4A-4B depict views of the assembly 300 in a different angle. The assembly 300 includes housing extensions and/or surfaces 356 serves as shield that shield the direct light from the light source. For example, the corner of the window is not visible to the light source of the assembly. The plane-of-shadow is pointed to by arrow B. In accordance with embodiments there is no direct line-of-sight from the camera lens 351 and/or window into the light source. Accordingly, the window(s) and camera(s) can be completely in shadow. This configuration eliminates the opportunity for glare from the light fixture to impact the quality of the optical image. The housing extensions and/or surfaces 356 can be seen more clearly in FIG. 5.

Figure 6:
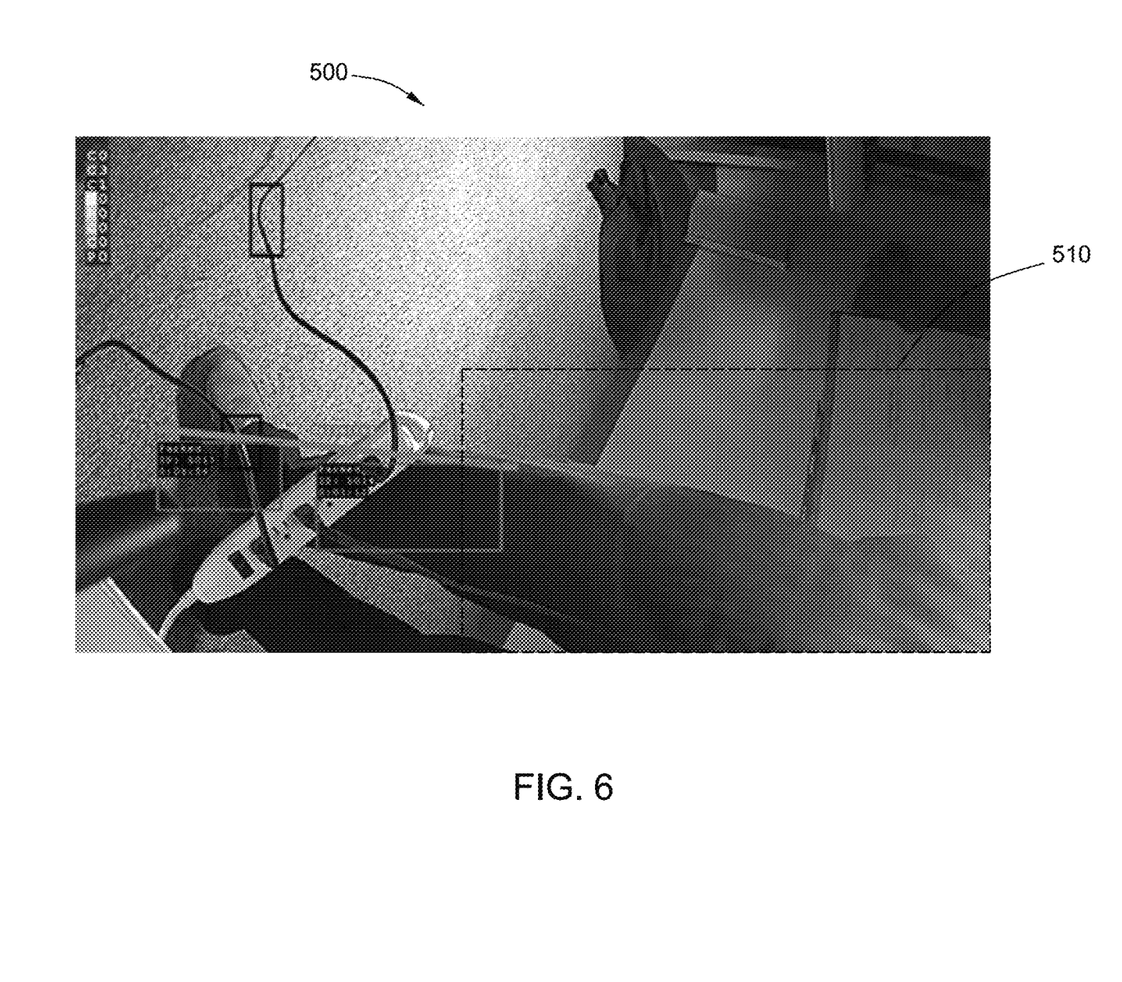
FIG. 6 depicts an image captured by a conventional optical imaging system.

To demonstrate the impact of dirt and/or glare, FIG. 6 depicts an image captured by a conventional optical system. As can be seen in region 510 the image suffers from glare. The glare could be caused by dirt and/or contamination on an optical window illuminated from a light source outside the optical system's field of view.

Figure 7:
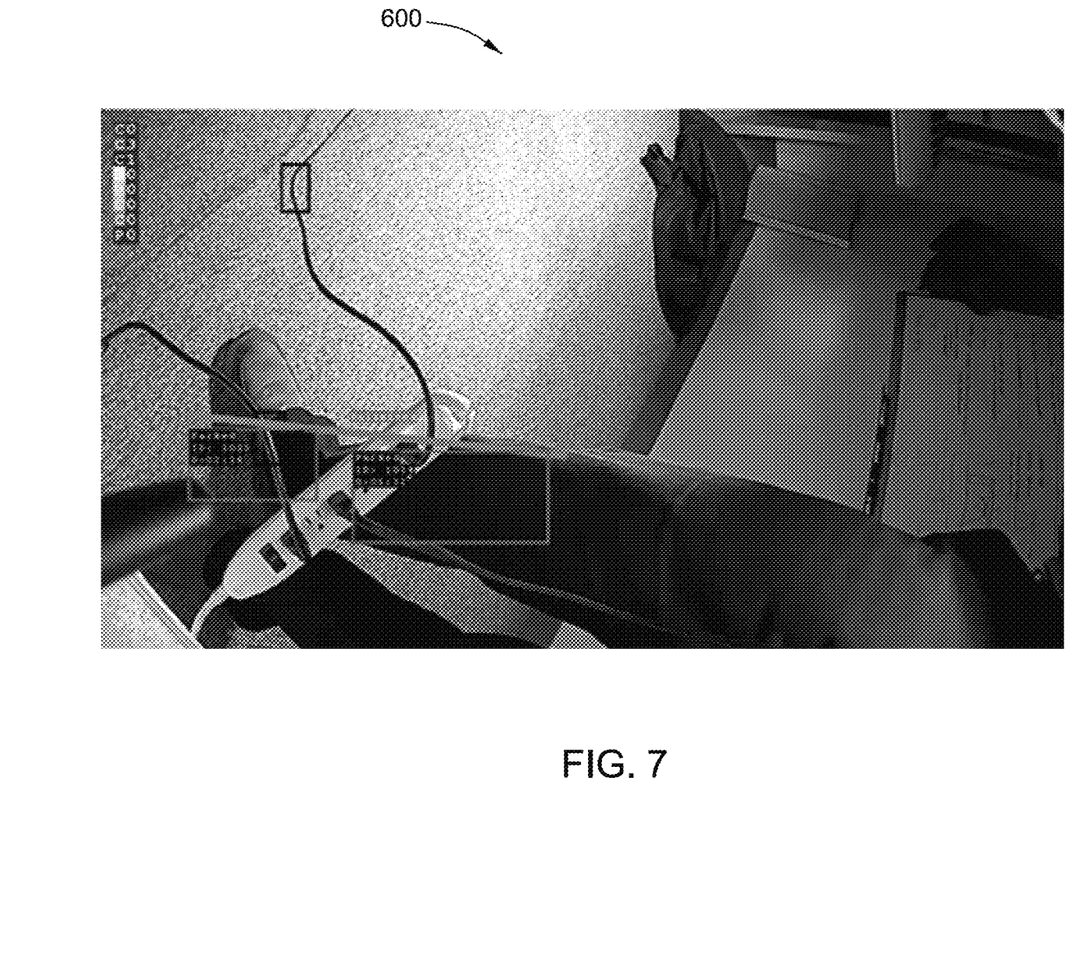
FIG. 7 depicts the image of FIG. 6 captured by an assembly in accordance with embodiments.

FIG. 7 depicts image 600, which is the same as image 500 but captured by the assembly in accordance with embodiments. This image was captured through the same dirty/contaminated window, with the imaging capturing device in the same position. However, the glare and/or streaking of region 510 is not visible in image 600. In accordance with embodiments, by shadowing windows on the housing that are in close proximity to light sources, the glare can be greatly reduced or eliminated.

In accordance with embodiments, there are one or more approaches to shadow the window of the housing. Some of these approaches are as follows:

1. External housing design such that the LED source cannot be visualized onto any working optical surface;

2. The addition of a hood or some other cylindrical or other shaped device or visor such that a shadow is cast onto the optical elements of the system or that the incoming light source is dispersed and made non-specular;

3. Positioning of an opaque or dispersive baffle or some other light interfering element between the light source and the optical system such that the working optical surfaces are not directly illuminated by the light source;

4. Lighting optical element design such that the source cannot be projected directly onto any optical surface of the camera; and 5. Preventing the light source from directly striking a working optical surface.

Sometimes in designing a system, it may be necessary to allow the camera to visualize a portion of the protective housing. This can happen due to overarching design constraints, etc., but generally, this does not prevent a system from being built. It is only necessary to instruct those users who are commissioning these systems, that there are positions that the cameras can be positioned in that may allow for visualization of the housing, and therefore blockage of some of the image of interest. When this happens, it is important to try to use sharp edges that can act as scattering surfaces from an off-axis source. Cylindrical edges can make this problem worse, so again, it is desirable to use sharp edges that can potentially acts as a scattering source.

Housing generated scattering sources can also be reduced/eliminated via the use of absorptive coatings, such as flat black paint or other matte, non-specular finishes. The application of these coatings to smooth surfaces in the vicinity of the camera (e.g., on the exterior and/or interior surfaces of the housing or on select interior components inside the housing) can prevent them from functioning as both powered (cylindrical, aspheric, toric & randomly shaped) and un-powered (piano) mirrors which will prevent them from re-directing the light source onto a working optical surface. In another embodiment, a separate light absorbing shield mounted inside or outside the assembly in the vicinity of the cameras to achieve similar result.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated.

What is claimed is:

1. An outdoor light fixture assembly, comprising:
    a roadway light fixture comprising an LED light source thereon;
    an image capturing device mounted with the assembly; and
    a shield of opaque or diffusive material provided between the light source and a working optical surface of the image capturing device for creating a shadow;
    the image capturing device being at least partially covered by a housing,
    wherein the housing has a window within a field of view of the image capturing device, at least a portion of the window serving as the working optical surface of the image capturing device, and
    wherein at least a portion of the window is located within a shadow of direct light from the light source.

2. The outdoor light fixture assembly of claim 1, wherein the shield serves as a part of the housing.

3. The outdoor light fixture assembly of claim 2, comprising a surface extended from the housing for shielding direct light from the light source.

4. The outdoor light fixture assembly of claim 1, wherein the shield forms at least one of cylindrical shape, visor, or hood.

5. The outdoor light fixture assembly of claim 1, wherein the light source comprises a reflector and a lamp within the reflector.

6. The outdoor light fixture assembly of claim 5, wherein the reflector comprises an ellipsoidal reflector.

7. The outdoor light fixture assembly of claim 1, wherein scattering material is provided on at least a portion of an outer surface of the housing for breaking up light from the light source.

8. The outdoor light fixture assembly of claim 7, wherein the scattering material is selected from diffuser or light absorbent material.

9. The outdoor light fixture assembly of claim 1, wherein the housing comprises absorptive coatings and/or non-specular finishes on at least a portion of an exterior and/or interior surface of the housing at least partially covering the image capturing device, or on interior components inside the housing.

10. The outdoor light fixture assembly of claim 1, wherein said shield is a shield of diffusive material provided between the light source and the working optical surface of the image capturing device.

11. An outdoor light fixture assembly, comprising:
    a roadway light fixture comprising an LED light source thereon;
    a camera mounted with the assembly; and
    a housing covering the camera, wherein the housing has a window within a field of view of the camera, the housing comprising a surface extending from the housing for shielding direct light from the light source;
    wherein at least a portion of the window serving as working optical surface of the camera is located within a shadow of direct light from the light source of the light fixture.

12. The outdoor light fixture assembly of claim 11, wherein the light source comprises a reflector and a lamp within the reflector.

13. The outdoor light fixture assembly of claim 12, wherein the reflector comprises an ellipsoidal reflector.

14. The outdoor light fixture assembly of claim 11, wherein scattering material is provided on the housing for breaking up light from the light source.

15. The outdoor light fixture assembly of claim 11, wherein the housing comprises absorptive coatings and/or non-specular finishes on at least a portion of an exterior and/or interior surface of the housing at least partially covering the image capturing device, or on interior components inside the housing.

16. An outdoor light fixture assembly, comprising:
    a roadway light fixture comprising an LED light source thereon;
    an image capturing device mounted with the assembly; and
    a shield of diffusive material provided between the light source and a working optical surface of the image capturing device;
    the image capturing device being at least partially covered by a housing, wherein the housing has a window within a field of view of the image capturing device, at least a portion of the window serving as the working optical surface of the image capturing device.

* * * * *